US 6,725,211 B1

(12) United States Patent
Ashton et al.

(10) Patent No.: US 6,725,211 B1
(45) Date of Patent: Apr. 20, 2004

(54) WORK LOAD ASSESSMENT HEURISTIC FOR OPTIMAL TASK PARALLELISM DETERMINATION

(75) Inventors: Lyn Leguam Ashton, Tucson, AZ (US); Cuong Minh Le, Tucson, AZ (US); Jerry Wayne Pence, Tucson, AZ (US); James Mitchell Ratliff, Benson, AZ (US); Glenn Randle Wilcock, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 09/672,676

(22) Filed: Sep. 28, 2000

(51) Int. Cl.⁷ .................................................. G06F 7/00
(52) U.S. Cl. ............................................ 707/2; 707/10
(58) Field of Search ................... 707/1–10; 709/100–105

(56) References Cited

U.S. PATENT DOCUMENTS

| | | | |
|---|---|---|---|
| 4,310,883 A | 1/1982 | Clifton et al. | 364/200 |
| 4,638,424 A | 1/1987 | Beglin et al. | 364/200 |
| 4,771,375 A | 9/1988 | Beglin et al. | 364/200 |
| 5,131,087 A | 7/1992 | Warr | 395/425 |
| 5,161,214 A | 11/1992 | Addink et al. | 395/145 |
| 5,506,986 A | 4/1996 | Healy | 395/600 |
| 5,701,482 A * | 12/1997 | Harrison et al. | 709/105 |
| 5,778,165 A | 7/1998 | Saxon | 395/182.02 |
| 5,813,005 A * | 9/1998 | Tsuchida et al. | 707/10 |
| 5,857,180 A * | 1/1999 | Hallmark et al. | 707/2 |
| 5,924,097 A * | 7/1999 | Hill et al. | 707/10 |
| 5,960,423 A | 9/1999 | Chaudhuri et al. | 707/2 |
| 6,101,495 A * | 8/2000 | Tsuchida et al. | 707/4 |
| 6,192,359 B1 * | 2/2001 | Tsuchida et al. | 707/4 |
| 6,256,621 B1 * | 7/2001 | Tsuchida et al. | 707/2 |

OTHER PUBLICATIONS

Rahm, Erhard, "Dyanamic Load Balancing in Parallel Database Systems", Aug. 1996, Proc, EURO–PAR 96 Conference, LNCS, Spring–Verlag, Lyon, 1–16.*

* cited by examiner

Primary Examiner—Greta Robinson
Assistant Examiner—Sathyanarayan R Pannala
(74) Attorney, Agent, or Firm—Konrad Raynes & Victor LL

(57) ABSTRACT

A technique for determining an optimal number of tasks for processing requests is provided. It is determined whether there are one or more first requests that have not been processed. A parallelism assessment is performed for simulating the assignment of said first requests to one or more task representations.

53 Claims, 13 Drawing Sheets

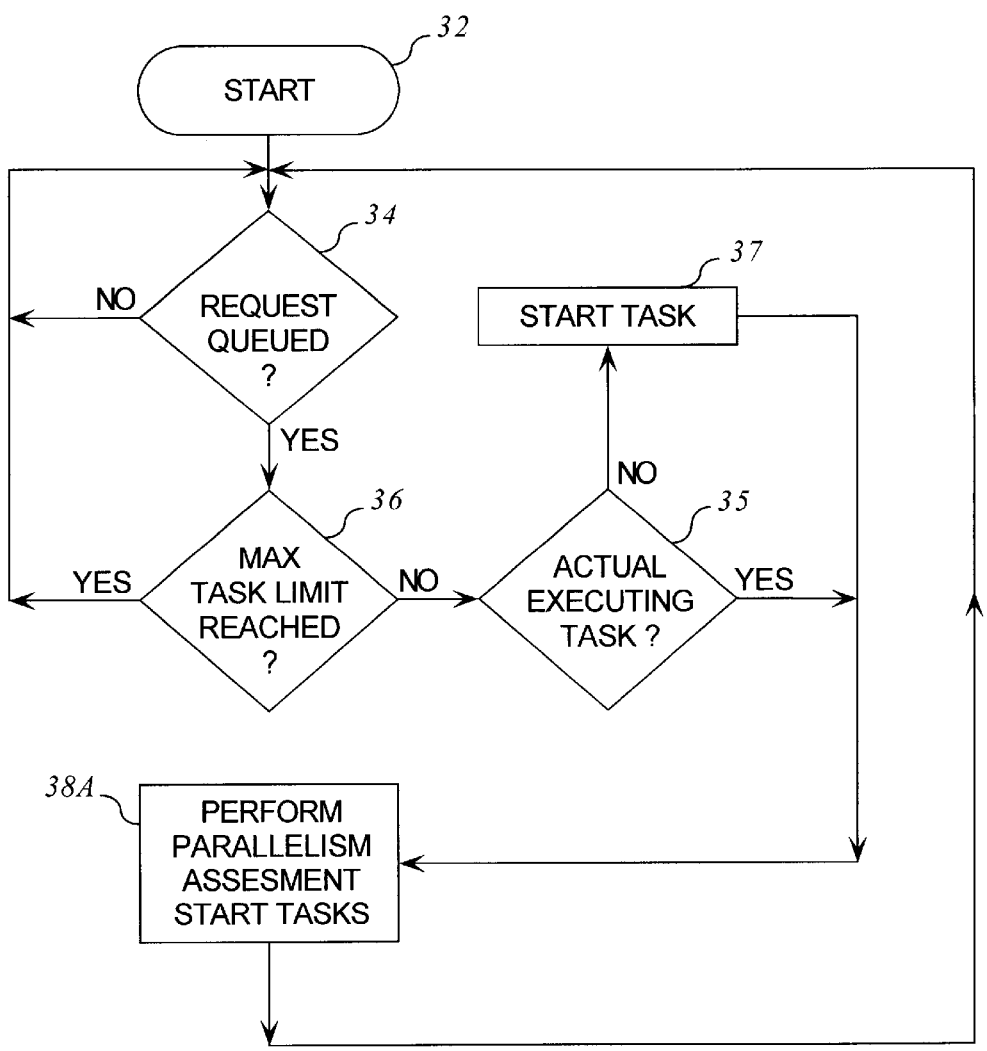

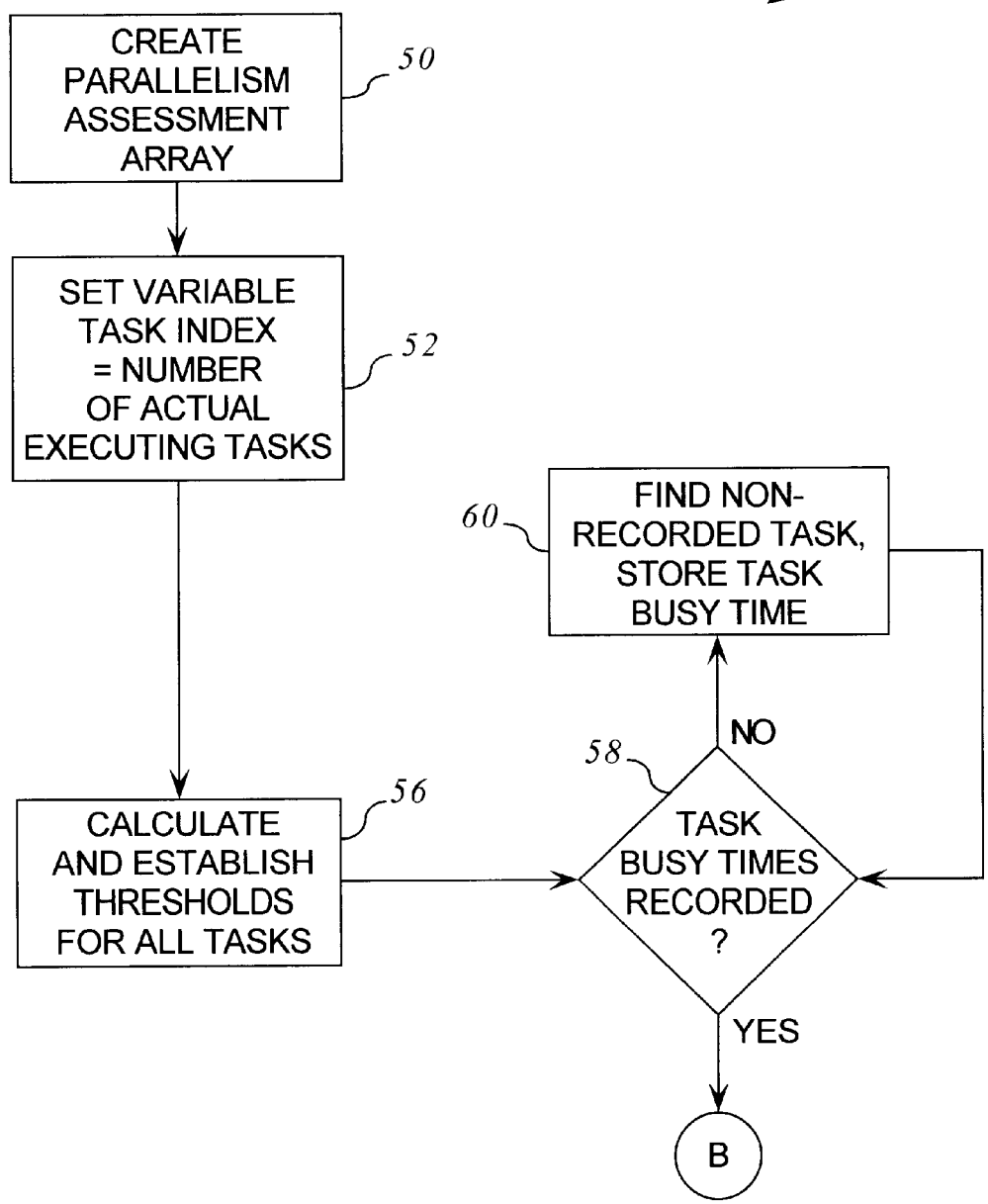

FIGURE 14

| VARIABLE TASK INDEX | 1 | 2 | 3 | 4 ↓92 | 5 |
|---|---|---|---|---|---|
| MIN WORK THRESHOLD | RQST 5 / RQST 2 / RMG WK | RQST 4 / RQST 3 / RQST 1 / RMG WK | RQST 7 / RQST 6 / STRT UP OVER HEAD | RQST 8 / STRT UP OVER HEAD | |
| TASK REPRESENTATION | EXIST 1 | EXIST 2 | PROJ 3 | PROJ 4 | |
| ARRAY ELEMENT | W1 | W2 | W3 | W4 | |

FIGURE 15

| VARIABLE TASK INDEX | 1 | 2 | 3 | 4 | 5 ↓92 |
|---|---|---|---|---|---|
| MIN WORK THRESHOLD | RQST 5 / RQST 2 / RMG WK | RQST 4 / RQST 3 / RQST 1 / RMG WK | RQST 7 / RQST 6 / STRT UP OVER HEAD | RQST 8 / STRT UP OVER HEAD | RQST 9 / STRT UP OVER HEAD |
| TASK REPRESENTATION | EXIST 1 | EXIST 2 | PROJ 3 | PROJ 4 | PROJ 5 |
| ARRAY ELEMENT | W1 | W2 | W3 | W4 | W5 |

WORK LOAD ASSESSMENT HEURISTIC FOR OPTIMAL TASK PARALLELISM DETERMINATION

BACKGROUND OF THE INVENTION

The present invention is related to backing up individual data sets, and more particularly, to a computer implemented method for determining an optimal number of tasks for processing data backup requests that may be executed in parallel.

In the past, the Data Facility Storage Management Subsystem hierarchical storage manager ("DFSMShsm") product has been used to supervise the processing of data storage requests. However, the hierarchical storage manager would start a data storage task for each request. A task would start up, process the request and then terminate. In such an environment, a task may be idle while waiting to process a request, or a request may await a tape mount of a newly starting task. The request might then be required to wait for that mount to complete as opposed to having a request processed by a task just finishing with a tape already mounted. This type of system operates with no regard for overhead costs in terms of either time or resources that become unavailable for processing other requests. Thus, the DFSMShsm product provides no method for minimizing overhead costs on a per request basis, nor does it optimize the use of available resources, resulting in unnecessary operation costs for end users. A need therefore exists for a data storage system that determines an optimal number of tasks to be executed so as to minimize or reduce the average overhead and processing costs of the requests that comprise the executing tasks.

SUMMARY OF THE INVENTION

The invention provides a computer implemented method that employs a parallel assessment algorithm for determining an optimal number of concurrently executing tasks for processing requests in the context of a computer hardware system. In general, the parallel assessment algorithm simulates the assignment of a request to a task representation based, in part, on the estimated processing times of simulated execution of task representations that represent actual executing tasks, but are not tasks themselves. An actual executing task is a sequence of executable instructions that causes work or requests to be processed, waits to process a request, or starts to process a request. There are two types of task representations. One type of task representation is an existing task representation which represents an actual executing task. The other type of task representation is a projected task representation which is a proposed executable task that is being considered for execution, but which is not being executed. A projected task may be pseudo-assigned one or more requests of which none represents a request that is being processed. Each task representation and actual executing task has an estimated task busy time (or task processing time) associated with it. The task busy time refers to the estimated time for completing the processing of all requests (also referenced as the task busy time) pseudo-assigned or assigned to a particular task representation or actual executing task, respectively. Requests are pseudo-assigned to the task representation having the least amount of task busy time if the task busy time is less than a minimum work threshold. The minimum work threshold represents a predetermined minimum processing time that justifies starting a task. In general, pseudo-assigning a request is the process of simulating the assignment of the processing time of a request to a task representation.

If the task busy times of all task representations equals or exceeds the minimum work threshold of all existing task representations, and the number of task representations does not exceed a maximum task index, a new projected task representation is defined to which the next non-pseudo-assigned request from the queue is pseudo-assigned. A non-pseudo-assigned request is a request that has not been pseudo-assigned to a task representation. Then a value representing the estimated processing time of a non-pseudo-assigned request and estimated start-up overhead time of starting a new task are added to an array value representing the task busy time for the new projected task representation. If the estimated processing time, i.e., task busy time, associated with projected task representation meets or exceeds a minimum threshold value, one embodiment of the parallel assessment algorithm indicates projected task representations that may be transformed into actual executing tasks, and another embodiment of the parallel assessment algorithm transforms the projected task representations into actual executing tasks. Transforming a task representation into an actual executing task means that a task is created that actually processes requests that were pseudo-assigned to the task representations in the simulation.

The foregoing features may be implemented in a number of different ways. For example, the invention may be implemented to provide a method for determining an optimal number of tasks for processing Requests. In another embodiment, the invention may be implemented to provide a signal bearing medium tangibly embodying a program of machine-readable instructions executable by a digital data processing apparatus. Another embodiment concerns logic circuitry having multiple interconnected electrically conductive elements configured for determining an optimal number of tasks for processing requests. In still another embodiment, the invention may be implemented as a computer hardware system.

The invention affords its users with a number of distinct advantages. For example, the invention determines an optimal number of tasks that may concurrently execute requests based on a particular system hardware environment. Another advantage of the invention is that it reduces the overhead costs of executing requests on a per request basis by optimizing the utilization of resources such as data storage devices. A further advantage of the invention is that it reduces the need for system over-capacity where newly started task s have to be terminated due to insufficient work for them to do, thus wasting resources. These and other advantages of the invention will become more apparent upon review of the accompanying specification, including the claims, and the drawings.

BRIEF DESCRIPTION OF THE DRAWINGS

FIG. 3A is a flow chart of a first embodiment of the parallelism determinator of FIG. 2.

FIG. 4B is a flow chart showing software operations for initializing the parallelism assessment routine of FIG. 3B.

FIGS. 8–15 illustrate an example of the operation of the parallel assessment algorithm depicted in FIGS. 4B and 5B.

Throughout the figures, like references refer to like elements.

DESCRIPTION OF THE PREFERRED EMBODIMENT

Figure 1:
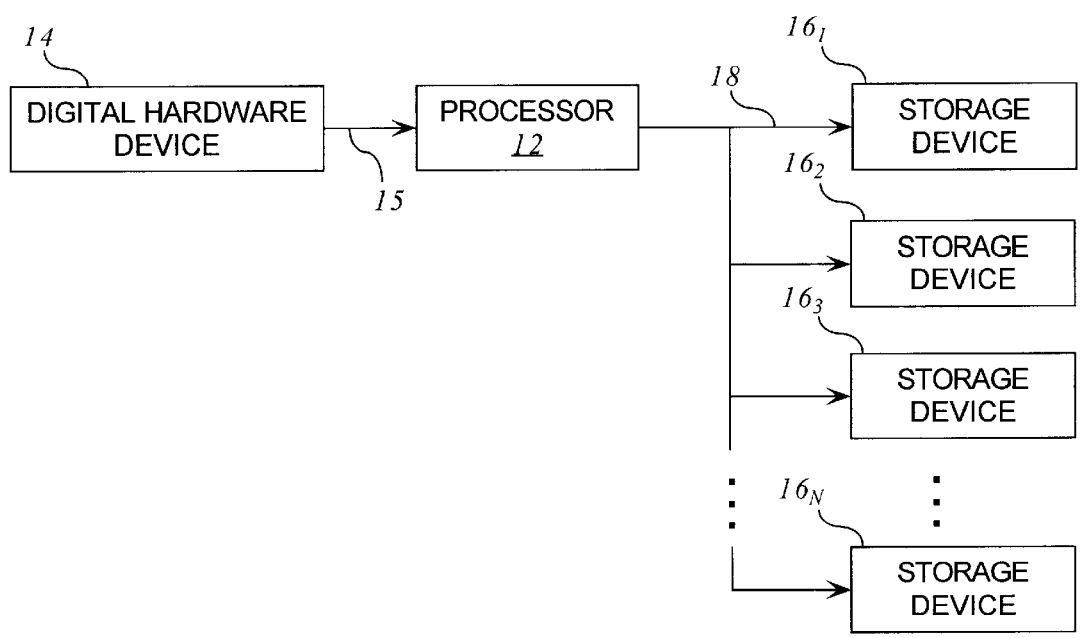
FIG. 1 is a block diagram of a system for processing multiple data set backup requests in parallel that embodies several features of the present invention.

The present invention is described with reference to FIGS. 1 and 2 where there is shown a system 10 for processing multiple data backup requests in parallel. System 10 includes at least one digital hardware device 14 which may be a computer keyboard terminal, processor, or the like for generating requests 15, a processor 12, and an N number of data storage devices $16_1, 16_2, 16_3, \ldots 16_N$, where N is a positive integer index. Processor 12 receives data storage requests 15 from digital hardware device 14 and stores the requests in a queue 13, shown in FIG. 2. Requests 15 may also be generated internally by processor 12. Processor 12 implements a parallel assessment algorithm that solves the problem of determining the number of executing tasks that may concurrently process requests 15. After a number of task representations are determined by the parallel assessment algorithm, the processor may generate supervisory commands via data bus 18 that direct one or more of data storage devices $16_i$ to process requests 15 where i is a positive integer index and $1 \leq i \leq N$. Data storage devices $16_i$ may include direct access storage devices (DASD), optical storage devices, tape drives, and the like.

Figure 2:
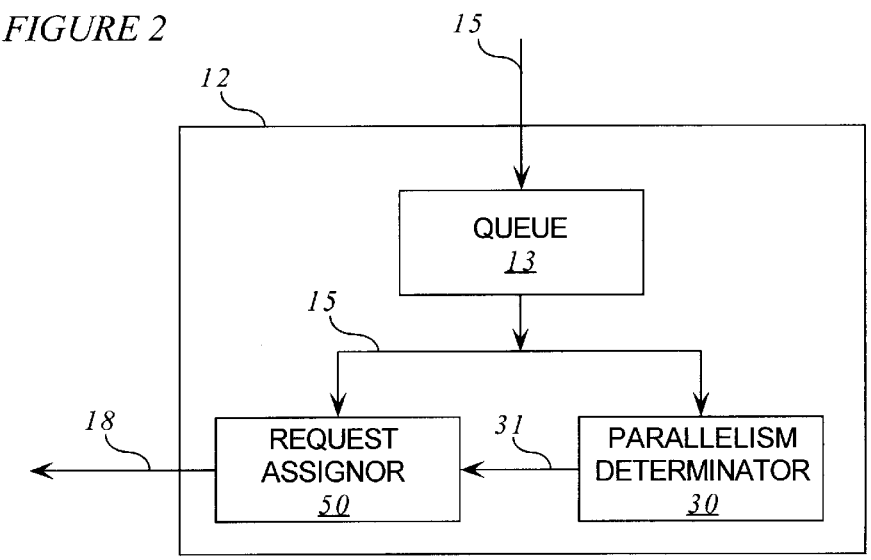
FIG. 2 is a block diagram of software implemented in the processor of FIG. 1 for determining optimal parallel processing of multiple data set back up requests.

Referring to FIG. 2, processor 12 employs a parallelism determinator routine 30, shown in FIG. 3A, that includes a parallelism assessment algorithm 38A for simulating the assignment of requests 15 stored in the queue 13 to actual executing tasks and projected tasks until all requests 15 have been assigned. After all of the requests 15 have been assigned, one embodiment of the parallel assessment algorithm indicates the number of tasks and designates the particular tasks that may be started for processing requests, and another embodiment of the parallel assessment algorithm actually starts the tasks. An actual executing task is a sequence of executable instructions that causes work or requests to be processed, waits to process a request, or starts to process a request. A request is an order to process data or execute an algorithm. By way of example, a request may be an order to store data in one or more of data storage devices $16_1-16_N$.

The processor 12 also includes an assignor routine 50 that assigns requests 15 to non-busy actual executing tasks based on the priority assigned a given request. A non-busy actual executing task is an actual executing task that is idle, i.e., waiting to process a request, or starting up. Information or data developed by the parallelism determinator routine 30 is available to the assignor routine 50 via influence line 31.

A first embodiment of the parallelism determinator routine 30 is shown in greater detail in FIG. 3A. Starting at operation 32, routine 30 proceeds to operation 34 which determines if requests 15 received from digital hardware device 14 have been placed in the queue 13 of processor 12. If there are no requests in the queue 13, the parallelism determinator 30 returns back to operation 34. However, if the determination at operation 34 is YES, i.e., there are requests in the queue 13, then operation 36 determines if there are a predetermined maximum number (the maximum task index) of actual executing tasks. The maximum task index m is generally based on a combination of the physical structure of system 10 and/or limitations placed on system 10 by a system administrator. If the determination at operation 36 is (YES) that the maximum number of actual executing tasks that are being processed in parallel equals the maximum task index m, then the parallelism determinator routine 30 returns to operation 34. If the determination of operation 36 is NO, then operation 35 determines if there are any actual executing tasks executing on system 10. If the determination at operation 35 is that there are no actual executing tasks processing requests, then the parallelism determinator 30 continues to operation 37 and starts a task. From operation 37 the parallelism determinator continues to operation 38A, also referenced as the parallel assessment algorithm 38A, described in detail further herein. If however, the determination at operation 35 is (YES) that there is at least one actual executing task, the parallelism determinator routine 30 continues directly to operation 38A. Operations 35 and 37 provide assurance that if there is a request in queue 15, but no actual tasks have been started, are processing requests, or are idle, then a task is started to make sure that the request does not reside in the queue 13 interminably.

Figure 4A:
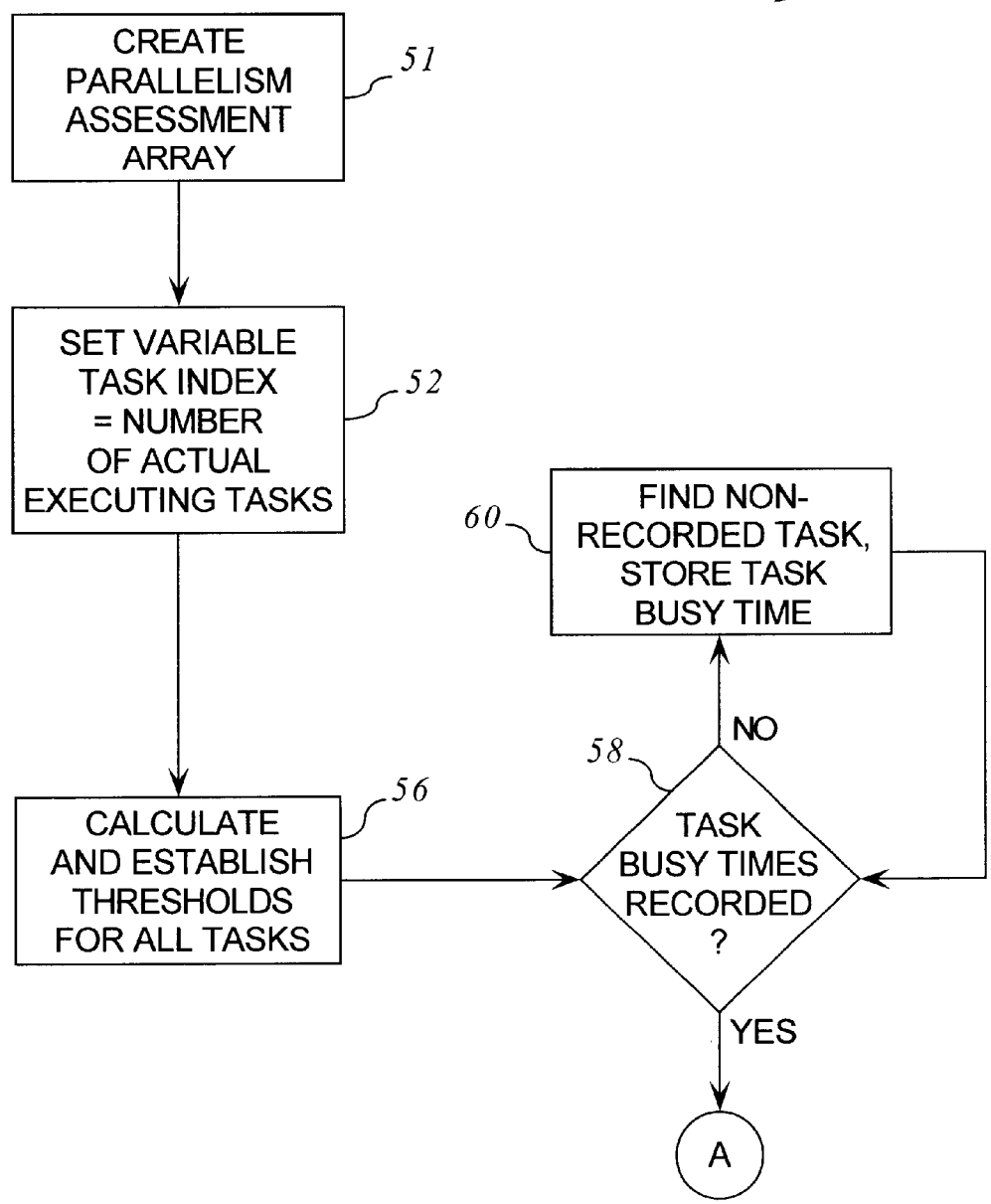
FIG. 4A is a flow chart showing software operations for initializing the parallelism assessment routine of FIG. 3A.
Figure 5A:
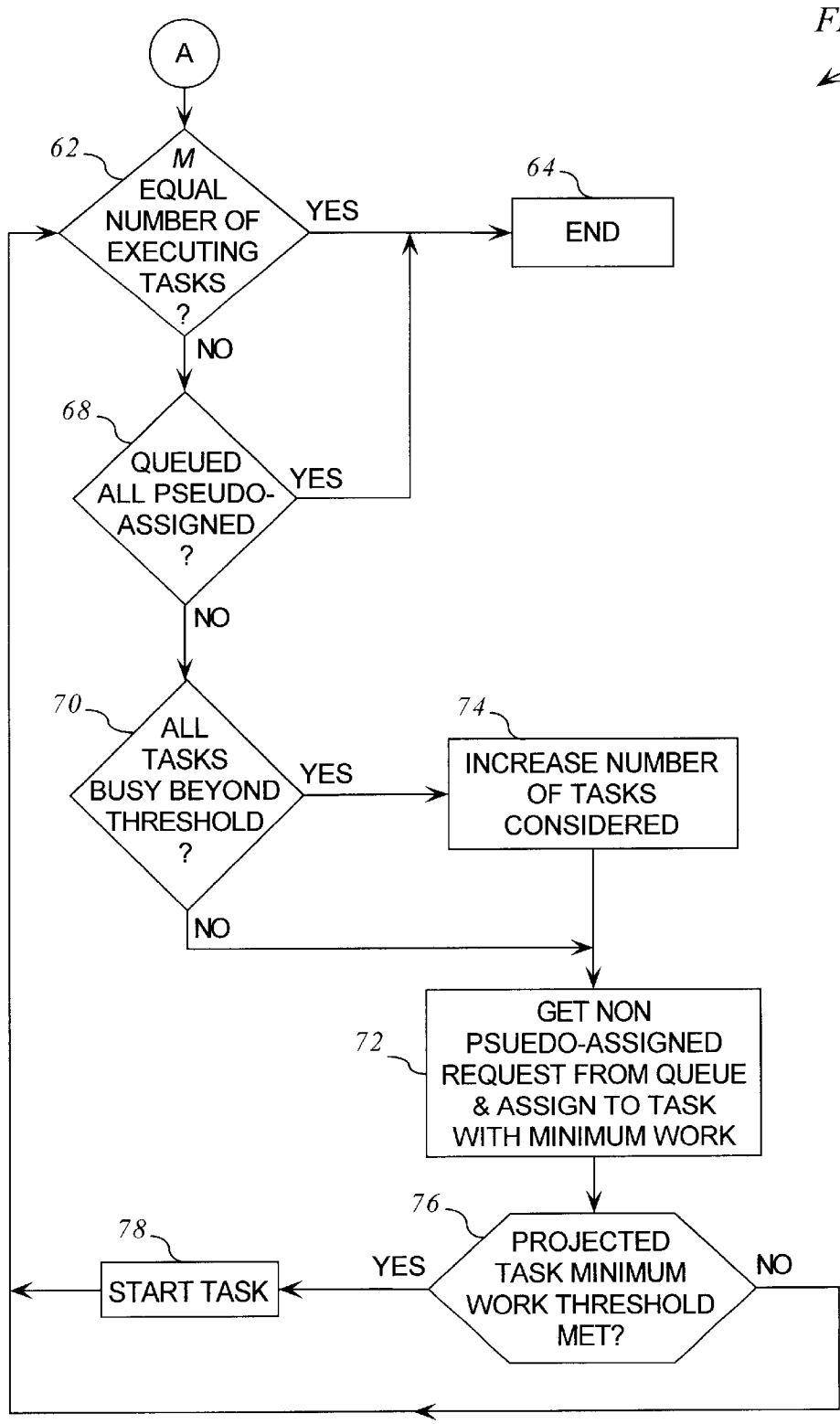
FIG. 5A is a flow chart of a first embodiment of software routine for performing the parallelism assessment algorithm implemented by the parallelism assessment determinator of FIG. 3A.

In general, the parallel assessment algorithm 38A shown in FIGS. 4A and 5A simulates the assignment of a request 15, i.e., pseudo-assigns requests, to a particular task representation based, in part, on the estimated processing times of task representations, where a task representation represents an actual executing task. The simulation of an assignment to a task representation is also referenced as a pseudo-assignment. An existing task representation is defined for each actual executing task. Each actual executing task has an estimated busy or task processing time associated with it. The task processing (busy) time may also refer to the estimated time for completing the processing of all requests (also referenced as task busy time) assigned and pseudo-assigned to particular existing and projected task representations. Requests are pseudo-assigned to the task representation having the least amount of task busy time provided that the task busy time is less than a minimum work threshold value representing a predetermined minimum processing time that justifies starting a task. In general, pseudo-assigning a request is the process of simulating the assignment of the processing time of a request to an existing or projected task representation. A more specific definition of pseudo-assigning a request is described further herein.

If the task busy times of all task, representations equal or exceed the minimum work threshold of all existing task representations, and the number of task representations does not exceed a maximum task index, a projected task representation is defined to which the next non-pseudo-assigned request from queue 13 is pseudo-assigned. A non-pseudo-assigned request is a request that has not been pseudo-assigned to a task representation. Then a value representing the estimated processing time of a non-pseudo-assigned request and estimated start-up overhead time of starting a new task are added to an array value representing the task busy time for the projected task representation. If the estimated processing time, i.e., task busy time, associated with a projected task representation meets or exceeds a minimum threshold value, the parallel assessment algorithms 38B indicates (FIGS. 3B, 4B, and 5B) projected tasks that may be transformed into actual executing tasks, and the parallel assessment algorithm 38A (FIGS. 3A, 4A, and 5A) transforms the projected task representations into actual executing tasks.

From operation 38A, parallelism determinator routine 30 returns to operation 34. The parallelism assessment algorithm 38A is described in greater detail below with reference to FIGS. 4A and 5A. At operation 51, a parallelism assessment array is created. This array includes array elements $W_1$, $W_2$, $W_3$, ... $W_m$ that represent the estimated times required to process the requests pseudo-assigned to tasks 1, 2, 3, ... m, respectively, where m is a positive integer that represents the maximum task index, defined above. More specifically, a pseudo-assigned request refers to adding a value representing the estimated processing time of a request 15 to the array element $W_i$ corresponding to that existing or projected task representation. Hereinafter, it is to be understood that existing and/or projected task representations may also be referenced as task representations. Array element $W_1$ corresponds to existing or projected task representation 1, $W_2$ corresponds to existing or projected task 2, and so on. The array elements may later further include the estimated start-up overhead times (costs) of projected tasks. Array elements $W_1$, $W_2$, $W_3$, ... $W_m$ are all initially set to zero. Then at operation 52 a variable task index, q, which is an integer, is set to equal the current number of actual executing tasks defined in the parallel assessment algorithm 38A that are being considered for having additional requests pseudo-assigned to such existing task representations. Next, at operation 56, values representing the minimum work threshold and start-up overhead time are established and will be used for all existing and projected task representations. Proceeding to operation 58, a determination is made as to whether all actual executing task processing times have been recorded. Recordation of task processing times refers to assuring that all actual executing tasks (existing tasks) are represented by a corresponding array element $W_i$ in the parallel assessment array, where i is an integer index and $1 \leq i \leq m$, and where the current value of $W_i$ represents the estimated time remaining to complete processing of the current request assigned to the actual executing task. If the determination at operation 58 is NO, then routine 38 continues to operation 60 which finds any non-recorded tasks. Non-recorded tasks are actually executing tasks that are not yet associated with a corresponding array element $W_i$ in the parallel assessment array. Operation 60 creates an existing task representation for the corresponding actual executing task by storing a representation of the estimated time to complete the request assigned to that actual executing task. Operation 60 is useful for identifying when the actual executing task will be available to process more requests. Storing the estimated time remaining to complete the currently processing request is achieved by adding a value representing the estimated time remaining to complete the currently processing request to the value of the array element $W_i$ corresponding to that actual executing task. From operation 60, routine 38A continues to operation 58, described above. If the determination of operation 58 is YES, then parallelism assessment algorithm 38A continues at operation 62, as shown in FIG. 5A.

Referring to FIG. 5A, routine 38A proceeds to operation 62 to determine if the maximum task index has been reached, i.e., if the maximum task index m equals the number of actual executing tasks. If the determination at operation 62 is YES, routine 38A continues to operation 64 where the parallelism determination process ends. However, if at operation 62, it is determined that the maximum task index m is greater than the number of actual executing tasks, then the parallel assessment algorithm 38A continues to operation 68 where a determination is made as to whether all of the queued requests 15 have been pseudo-assigned. If the determination at operation 68 is that all queued requests 15 have been pseudo-assigned, then routine 38A continues to operation 64 and ends. If the determination at operation 68 is that all queued requests 15 have not been pseudo-assigned, then operation 70 determines whether all existing and projected task representations have corresponding array elements that have values exceeding their respective minimum work thresholds. If the determination at operation 70 is that all existing and projected task representations are not busy beyond their minimum work thresholds, then at operation 72, a request from the queue that has not been pseudo-assigned is pseudo-assigned to the particular existing or projected task with the least amount of work to do, where the amount of work is referenced as the total time for executing the presently executing (remaining work) and non-executing requests that may be associated with that particular task. If, however, the determination at operation 70 is that all task representations are busy beyond their respective minimum work thresholds, then the variable task index q is increased at operation 74, thereby adding a projected task representation into the simulation. A task representation is busy beyond its work threshold if the value of array element $W_i$ corresponding to that task representation equals or exceeds the minimum work threshold for that task representation. From operation 74, routine 38A continues to operation 72. Operation 72 now pseudo assigns work or a request to this new projected task representation, i.e., a value representing the estimated processing time of the request is added to the value of the array element $W_i$ corresponding to the new projected task representation. Operation 72 also pseudo-assigns a value representing the start-up overhead time to the value of array element $W_i$, where the start-up overhead time is an estimation of the amount of time required to start a task. Proceeding from operation 72, operation 76 determines if the task representation identified in operation 72 is a projected task representation having its minimum work threshold met. If the determination at operation 76 is YES, i.e., that the task representation identified in operation 72 is a projected task that has met its minimum work threshold, then at operation 78, the projected task representation is started and transformed into an actual executing task. If, however, the determination at operation 76 is that the task representation identified by operation 72 is not a projected task representation, or is a projected task representation that has not met its overhead time threshold, then routine 38A returns directly to operation 62.

Referring to FIGS. 4A and 5A, the parallel assessment algorithm 38A may be summarized as performing the operations of: a) defining a maximum task index, m, where m is a positive integer; b) setting a variable task index, q, equal to a number of actual executing tasks $TSK_1$, $TSK_2$, ... $TSK_q$, where q is an integer index and $1 \leq q \leq m$; c) defining task representations $TR_1$, $TR_2$, ... $TR_q$ that represent said actual executing tasks $TSK_1$, $TSK_2$, ... $TSK_q$, respectively; d) creating a parallel assessment array that includes array elements $W_1$, $W_2$, ... $W_m$ each having a value, where $W_1$, $W_2$, ... $W_q$ represent estimated task busy times of the actual executing tasks $TSK_1$, $TSK_2$, ... $TSK_q$, respectively; e)

establishing a minimum work threshold value; f) determining if the number of actual executing tasks is equal to the maximum task index m; g) determining if all requests in a queue have been pseudo-assigned to any of the task representations $TR_1, TR_2, \ldots TR_q$; h) determining if each of the array elements $W_1, W_2, \ldots W_q$ are equal to or greater than the minimum work threshold; i) incrementing the task index by setting q=q+1, then defining a task representation $TR_v$, where v=q, and increasing the array element $W_v$ by a value that represents a start-up overhead time of the projected task representation $TR_v$ if the result of the Operation (h) is that each of the array elements $W_1, W_2, \ldots W_q$ are equal to or greater than the minimum work threshold; j) retrieving a non-pseudo-assigned request from the queue, where the non-pseudo-assigned request has an estimated processing time, identifying the array element $W_p$, where p is a positive integer index, $1 \leq p \leq q$, and the array element $W_p$ is a minimum of the array elements $W_1, \ldots W_q$, and increasing the array element $W_p$ by a value representing the estimated processing time of the non-pseudo-assigned request, and pseudo-assigning the request to the task representation $TR_p$; k) determining if the array element $W_p$ is equal to or greater than the minimum work threshold; l) transforming the task representation $TR_p$ into an actual executing task $TSK_p$ and then returning to operation (f) if the determination of operation (k) is that the array element $W_p$ is equal to or greater than said minimum threshold and if p=v; and m) returning to the operation (f) if the result of the operation (k) is that the array element $W_p$ is less than the minimum work threshold.

Figure 6:
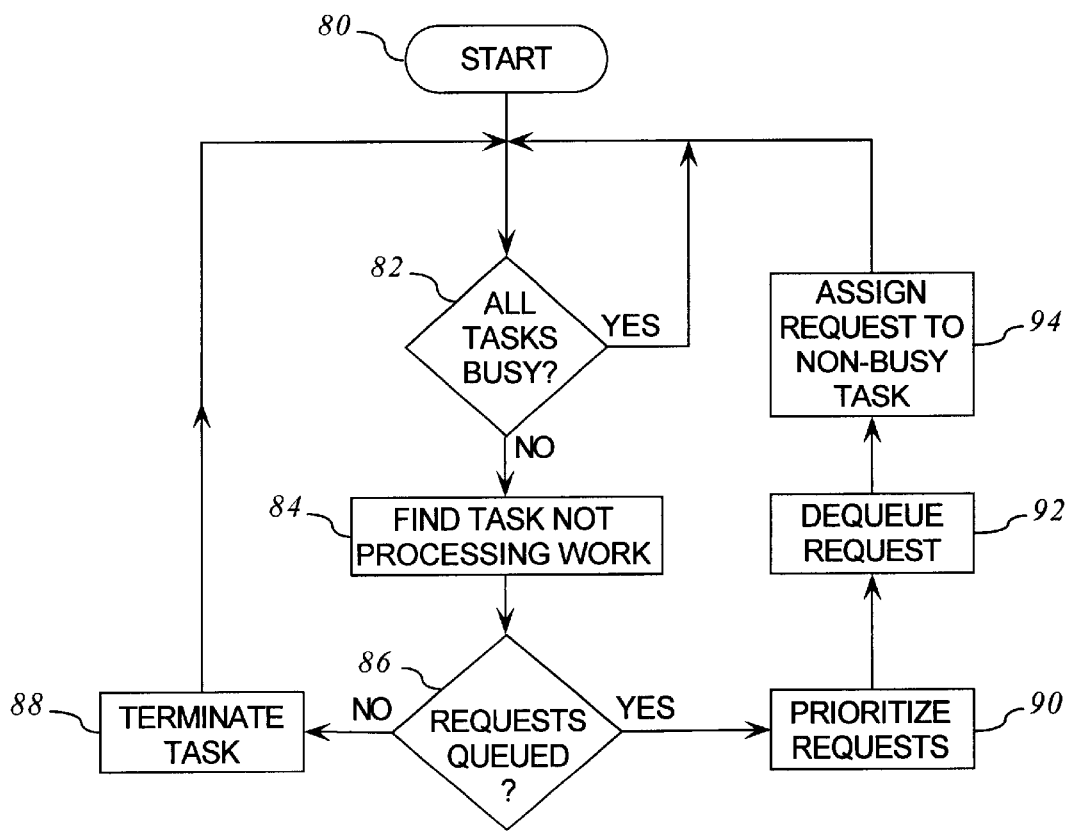
FIG. 6 is a flow chart of the request assignor of FIG. 2.

Processor 12 also implements the request assignor routine 50, described in greater detail with reference to FIG. 6. The request assignor routine 50 may run in parallel or serially with respect to the parallelism determinator routine 30. The request assignor routine 50 removes requests from the queue 13 and assigns them to one or more actual (executing) tasks. As previously stated, an actual executing task is one that is processing a request, is idle, or waiting to process a request, as opposed to existing and projected task representations which are simulations associated with the parallel assessment algorithms 38A and 38B that represent tasks. Starting at operation 80, request assignor routine 50 continues to operation 82 and determines if all actual executing tasks are busy. If at operation 82 all actual executing tasks are determined to be busy, request assignor routine 50 returns to operation 82. If the determination at operation 82 is that all actual executing tasks are not busy, then request assignor routine 50 finds a non-busy task at operation 84, where a non-busy task is an actual executing task that is idle. Proceeding to operation 86, a determination is made as to whether a request 15 is currently stored in queue 13. If the determination at operation 86 is NO, request assignor routine 50 continues to operation 88 which initiates a command to terminate the actual executing task. Then from operation 88, request assignor routine 50 returns to operation; 82. However, if the determination at operation 86 is that a request 15 is stored in queue 13, the requests in the queue 13 are prioritized at operation 90, and then the request having the highest priority is dequeued, or removed from the queue 13 at operation 92. Next, at operation 94, the request dequeued at operation 92 is assigned to the non-busy, actual executing task found at operation 84. The non-busy task is now busy processing the request just removed from the queue at operation 92. From operation 94, request assignor routine 50 returns to operation 82 to determine if all actual executing tasks are processing requests.

A second embodiment of parallelism determinator routine 30 is described with reference to FIGS. 3B, 4B, and 5B.

Figure 3B:
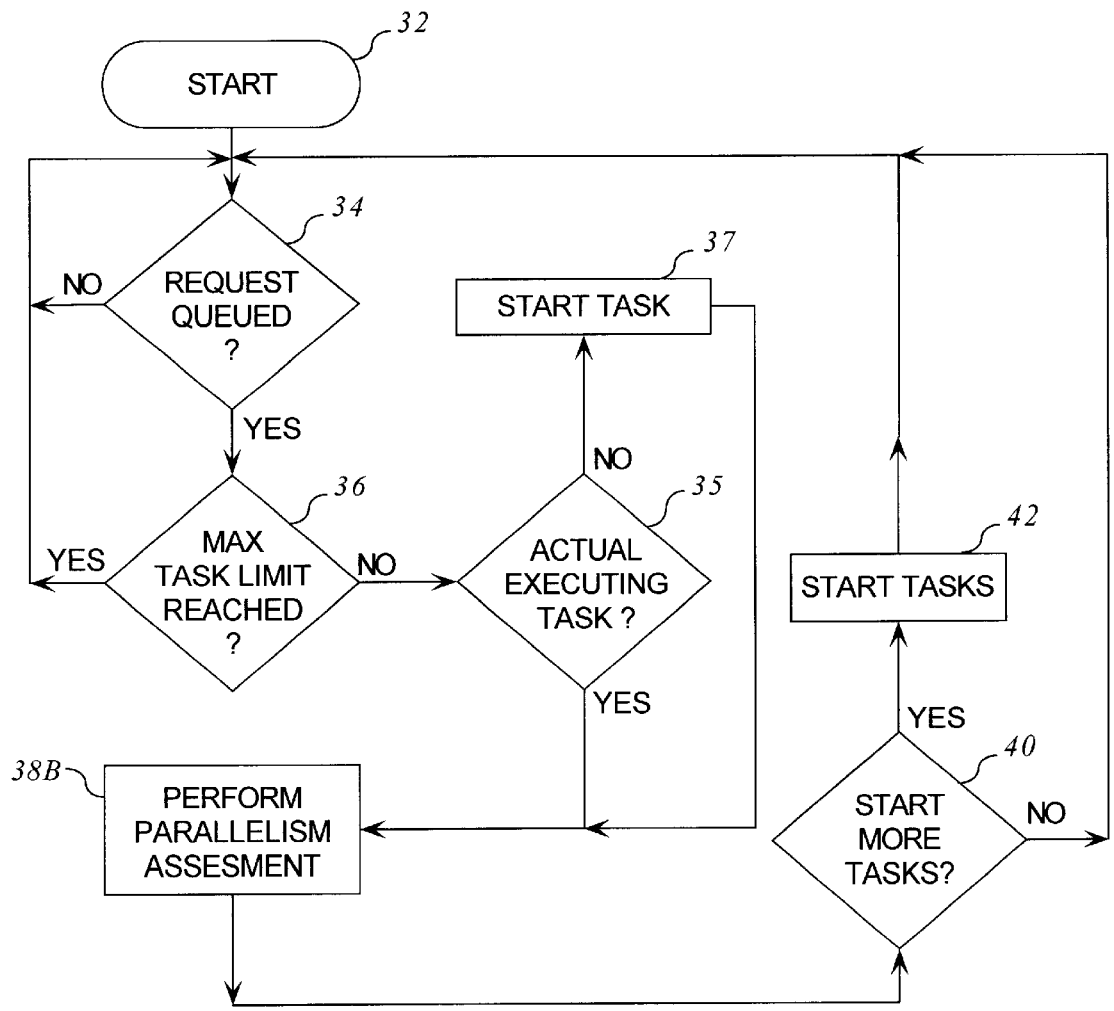
FIG. 3B is a flow chart of a second embodiment of the parallelism determinator of FIG. 2.

Referring to FIG. 3B and starting at operation 32, routine 30 proceeds to operation 34 which determines if requests 15 have been placed in queue 13 by processor 12. If there are no requests in the queue 13, the parallelism determinator routine 30 returns back to operation 34. However, if the determination at operation 34 is YES, i.e., there are requests in the queue 13, then operation 36 determines if there are a predetermined maximum number (the maximum task index) of actual executing tasks. As previously stated, the maximum task index m is generally based on a combination of the physical structure of system 10 and/or limitations placed on system 10 by a system administrator. If the determination at operation 36 is (YES) that the maximum number of actual executing tasks that are being processed in parallel by system 10 equals the maximum task index m, then the parallelism determinator routine 30 returns to operation 34. If the determination of operation 36 is NO, then operation 35 determines if there are any actual executing tasks executing on system 10. If the determination at operation 35 is that there are no actual executing tasks processing requests, then the parallelism determinator 30 continues to operation 37 and starts a task. From operation 37 the parallelism determinator continues to operation 38B, also referenced as the parallel assessment algorithm 38B, described in detail further herein. If however, the determination at operation 35 is (YES) that there is at least one actual executing task being executed by system 10, the parallelism determinate routine 30 continues directly to operation 38B. Operations 35 and 37 provide assurance that if there is a request in queue 15, but no actual tasks have been started, are processing requests, or are idle, then a task is started to make sure that the request does not reside in the queue 13 interminably. The parallel assessment algorithm 38B is identical to parallel assessment algorithm 38A except operation 38B (shown in FIG. 3B) does not transform existing task representations into actual executing tasks as does operation 38A (shown in FIG. 3A).

In FIG. 3B the parallel assessment algorithm 38B continues to operation 40 where a determination is made as to whether more task representations should be transformed (started) into actual executing tasks by examining the number of task representations that operation 38B indicated may be started. If the determination at operation 40 is that there are no projected task representations to start, the parallelism determinator 30 returns to operation 34. However, if the determination at operation 40 is that there are existing or projected tasks to start, then operation 42 transforms such task representations into actual executing tasks, and routine 30 returns to operation 34. Referring to FIG. 5B, the parallel assessment algorithm 38B differs from routine 38A in that if the determination at operation 76 of FIG. 5B is YES, i.e., that the projected task minimum work threshold has been met, then operation 79 indicates the number of projected task representations to be started, or transformed into actual executing tasks. From operation 79, routine 38 returns to operation 62. Operation 62 also differs in that it determines if m is equal to the number of actual executing tasks and the number of tasks indicated to be started by step 79.

Figure 5B:
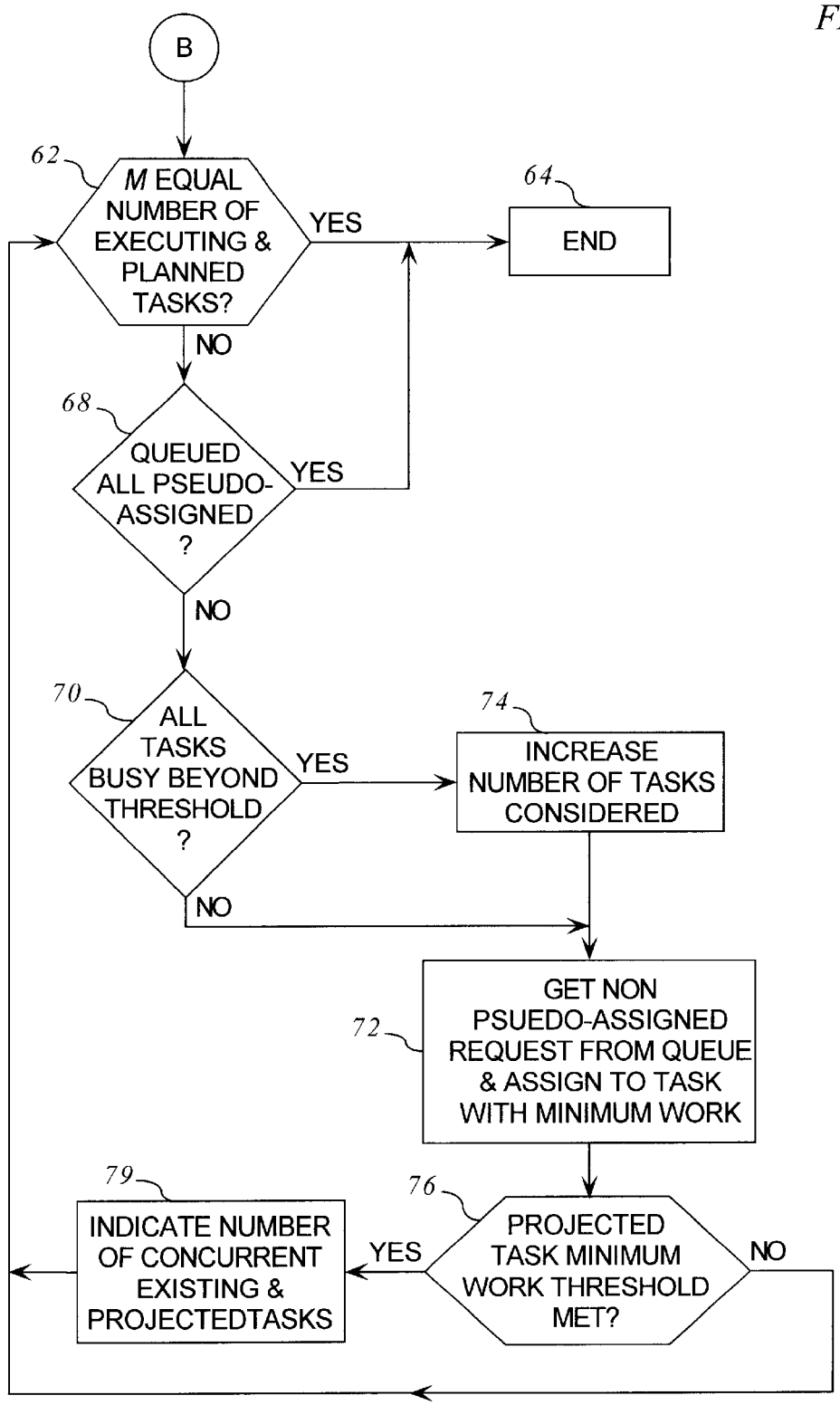
FIG. 5B is a flow chart of a second embodiment of software routine for performing the parallelism assessment algorithm implemented by the parallelism assessment determinator of FIG. 3B.

Referring to FIGS. 4B and 5B, the parallel assessment algorithm 38B may be summarized as performing the operations of: a) defining a maximum task index, m, where m is a positive integer; b) setting a variable task index, q, equal to a number of actual executing tasks $TSK_1, TSK_2, \ldots TSK_q$, where q is an integer index and $1 \leq q \leq m$; c) defining task representations $TR_1, TR_2, \ldots TR_q$ that represent said actual executing tasks $TSK_1, TSK_2, \ldots TSK_q$, respectively; d) creating a parallel assessment array that includes array elements $W_1, W_2, \ldots W_m$ each having a value, where $W_1$, $W_2, \ldots W_q$ represent estimated task busy times of the actual executing tasks $TSK_1, TSK_2, \ldots TSK_q$, respectively; e) establishing a minimum work threshold value; f) determining if the number of actual executing tasks and planned tasks is equal to the maximum task index m; g) determining if all requests in a queue have been pseudo-assigned to any of the task representations $TR_1, TR_2, \ldots TR_q$; h) determining if each of the array elements $W_1, W_2, \ldots W_q$ are equal to or greater than the minimum work threshold; i) incrementing the task index by setting q=q+1, then defining a task representation $TR_v$, where v=q, and increasing the array element $W_v$ by a value that represents a start-up overhead time of the projected task representation $TR_v$ if the result of the operation (h) is that each of the array elements $W_1$, $W_2, \ldots W_q$ are equal to or greater than the minimum work threshold; j) retrieving a non-pseudo-assigned request from the queue, where the non-pseudo-assigned request has an estimated processing time, identifying the array element $W_p$, where p is a positive integer index, $1 \leq p \leq q$, and the array element $W_p$ is a minimum of the array elements $W_1, \ldots W_q$, and increasing the array element $W_p$ by a value representing the estimated processing time of the non-pseudo-assigned request, and assigning the request to the task representation $TR_p$; k) determining if the array element $W_p$ is equal to or greater than the minimum work threshold; l) generating an indication that the task representation $TR_p$ is available for transformation into an actual executing task and then returning to operation (f) if the determination of the operation (k) is that the array element $W_p$ is equal to or greater than the minimum threshold and if p=v; and m) returning to the operation (f) if the result of the operation (k) is that the array element $W_p$ is less than the minimum work threshold.

Figure 7:
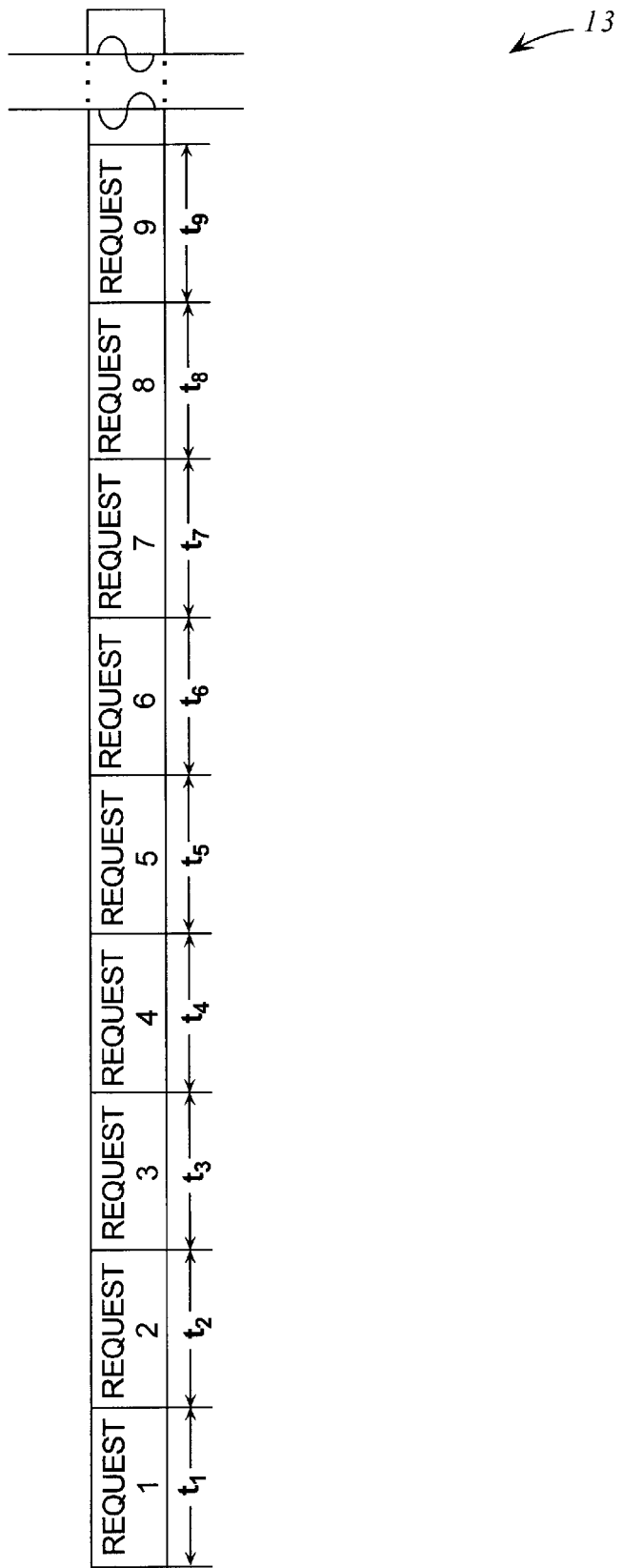
FIG. 7 shows an example of the request queue storing 9 requests.

FIGS. 7–15 illustrate an example of the operation of the parallel assessment algorithm 38B depicted in FIGS. 4B and 5B. For this example, there are nine requests to be processed, a maximum of five tasks may concurrently process requests because the maximum task index m is equal to five in this example, and five storage devices 16 (See FIG. 1) coupled to processor 12, where N=5. Further, there are two actual executing tasks already processing remaining work (RMG WRK) or requests. As shown in FIG. 7, the nine requests in the above-referenced example are designated as requests $R_1$–$R_9$ and are stored in queue 13 of processor 12. In FIG. 7, the lengths $t_1, t_2, \ldots t_9$ are represented as being proportional to the estimated processing times of requests $R_1, R_2, \ldots R_9$, respectively. By way of example, queue 13 may store 9 or more requests, as required to suit the needs of a particular application. The problem to be solved by the parallelism assessment algorithm 38B is to provide a simulation that determines the optimal number of tasks that may be used to process some or all of the nine requests in this example and to pseudo-assign the requests amongst the existing and/or projected task representations defined in the simulation so as to minimize the costs of processing the requests and maximize the economical utilization of storage devices $16_1$–$16_N$.

Referring to FIG. 4B, at operation 50 the parallelism assessment array is created. The parallelism assessment array includes array elements $W_1, W_2, W_3, W_4$, and $W_5$ which are each initialized to equal zero. The five array elements $W_1, W_2, W_3, W_4$, and $W_5$ each are defined to cardinally represent one of the five allowed tasks that may concurrently process requests. At operation 52, the variable task index is set to equal the current number of actual executing tasks, which in this example is 2. The two actual executing tasks are represented in the simulation performed by the parallel assessment algorithm 38B as existing task representations 1 and 2 shown in FIG. 8. At operation 56 the minimum work thresholds are established for all existing and projected task representations permitted in this example of the operation of the parallel assessment algorithm 38B. The minimum work threshold is a value that represents the minimum amount of work that justifies starting a task, i.e, transforming a projected task representation into an actual executing task. By way of example, work may be referenced in units of time and includes the estimated processing time of one or more requests and may also include the start-up time required to transform a projected task representation into an actual executing task. Because there are two actual executing tasks (actual executing tasks 1 and 2) in the example that are processing requests, array elements $W_1$ and $W_2$ represent the estimated times for processing the remaining work of actual executing tasks 1 and 2, while array elements $W_3$–$W_5$ remain at their initial values of zero. Continuing to operation 58, a determination is made that all task busy times are recorded.

Figure 8:
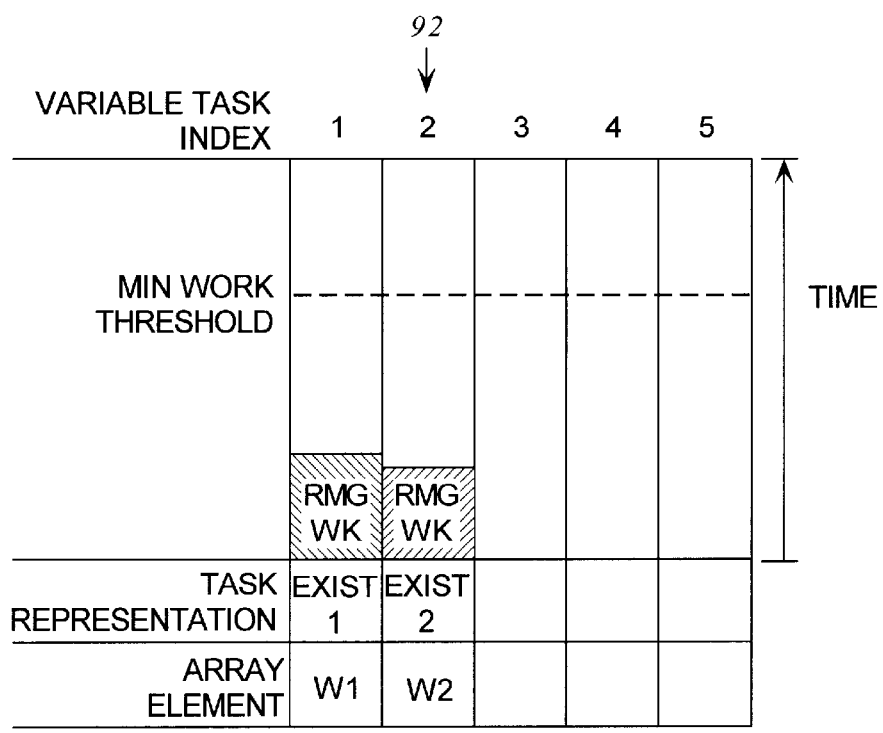

Operation 62, shown in FIG. 5B, determines that the number of actual executing tasks and planned tasks does not equal or exceed the maximum task index m because there are only two existing task representations defined in the simulation, although 5 existing and projected tasks representations are permitted. A planned task is a task that has not yet been started and corresponds to a projected task having an estimated busy time that equals or exceeds the minimum work threshold. Therefore, the parallel assessment algorithm continues to operation 68 where a determination is made that not all of the nine requests stored in queue 13 are pseudo-assigned to an existing or projected task representation. Next, operation 70 determines that all of the existing task representations are not busy beyond their respective minimum work thresholds because as shown in FIG. 8, the estimated times to complete processing of the remaining work (RMG WRK) assigned to existing task representations 1 and 2 are less than the minimum work thresholds for those existing task representations.

Figure 9:
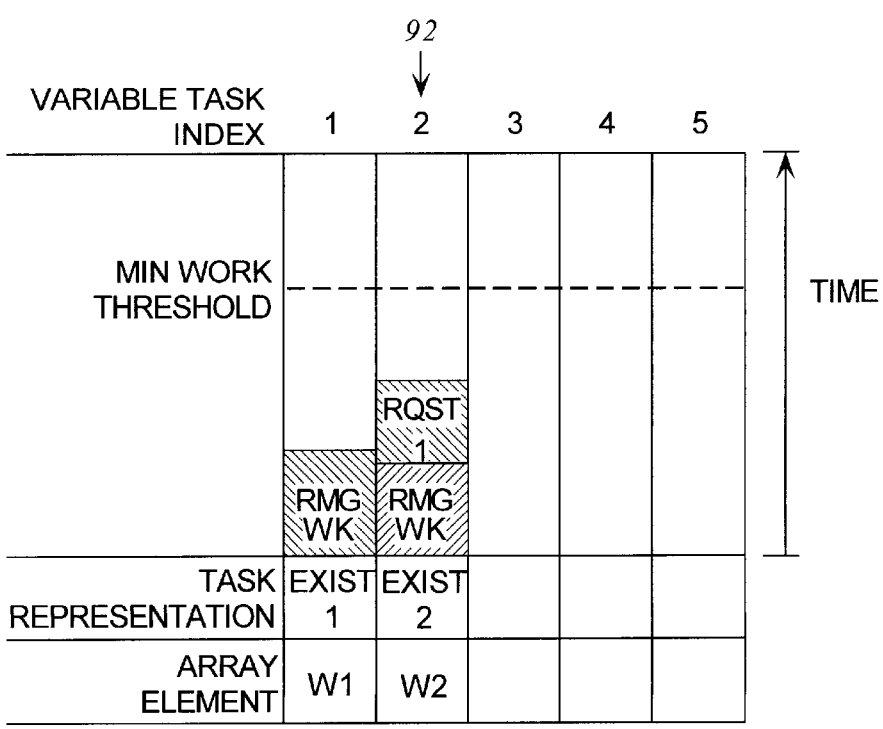

Now referring to FIGS. 5B and 9, at operation 72 request $R_1$ is retrieved from queue 13 and is pseudo-assigned to existing task representation 2 because existing task representation 2 has the least amount of simulated work to process as between existing task representations 1 and 2. Simulated work represents an estimate of the processing time for executing a request. With regard to existing task representation 2, the phrase "pseudo-assigned" means that a value representing the estimated processing time for request $R_1$ has been added to the value of array element $W_2$. Next, operation 76 determines that existing task representation 2 is not a projected task representation. Therefore, the parallel assessment algorithm 38B returns to operation 62. At this stage in the operation of the parallel assessment algorithm 38B, FIG. 9 shows that $W_1<W_2$ and the variable task index q is 2, as shown by arrow 92.

Figure 10:
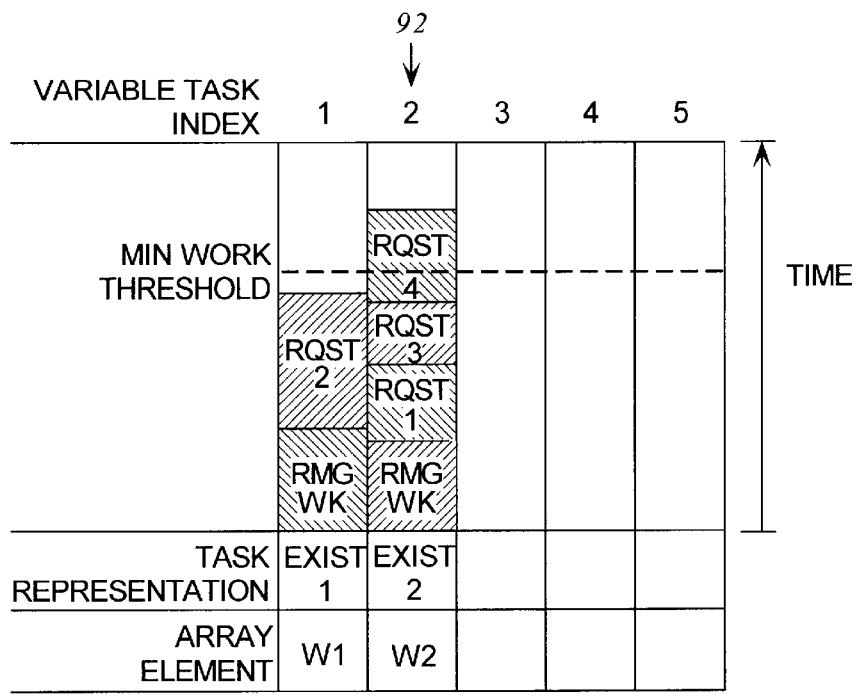

The parallel assessment algorithm 38B continues through operations 62, 68, and 70 as described above whereupon at operation 72, request $R_2$ is retrieved from queue 13, and as shown in FIG. 10, request $R_2$ is pseudo-assigned to existing task representation 1, whereupon $W_1$ is incremented by a value representing the estimated time for processing request $R_2$. At this stage, $W_2<W_1$. Operation 76 determines that existing task representation 1 is not a projected task representation so the parallel assessment algorithm 38B returns directly to operation 62. The variable task index q is 2, as shown by arrow 92 in FIG. 10.

Still referring to FIGS. 5B and 10, the parallel assessment algorithm 38B continues through operations 62, 68, and 70 as described above. Then at operation 72, request $R_3$ is retrieved from queue 13. Because $W_2<W_1$, request $R_3$ is pseudo-assigned existing task representation 2, whereby the value of array element $W_2$ is incremented by a value representing the estimated time for processing request $R_3$. At this stage, $W_2$ is still less than $W_1$. At operation 76 a determination is made that existing task representation 2 is not a projected task representation so the parallel assessment algorithm 38B returns directly to operation 62. The variable task index q remains equal to 2, as shown by arrow 92.

The parallel assessment algorithm 38B continues through operations 62, 68, and 70 as described above whereupon at operation 72, request $R_4$ is retrieved from queue 13. Because $W_2<W_1$, request $R_4$ is pseudo-assigned to existing task representation 2, whereby the value of array element $W_2$ is incremented by a value representing the estimated time for processing request $R_4$. However, now $W_2>W_1$, and $W_2$ exceeds the minimum work threshold for existing task representation $W_2$. The parallel assessment algorithm 38B then returns to operation 62. The variable task index q is still 2, as shown by arrow 92 in FIG. 10.

Figure 11:
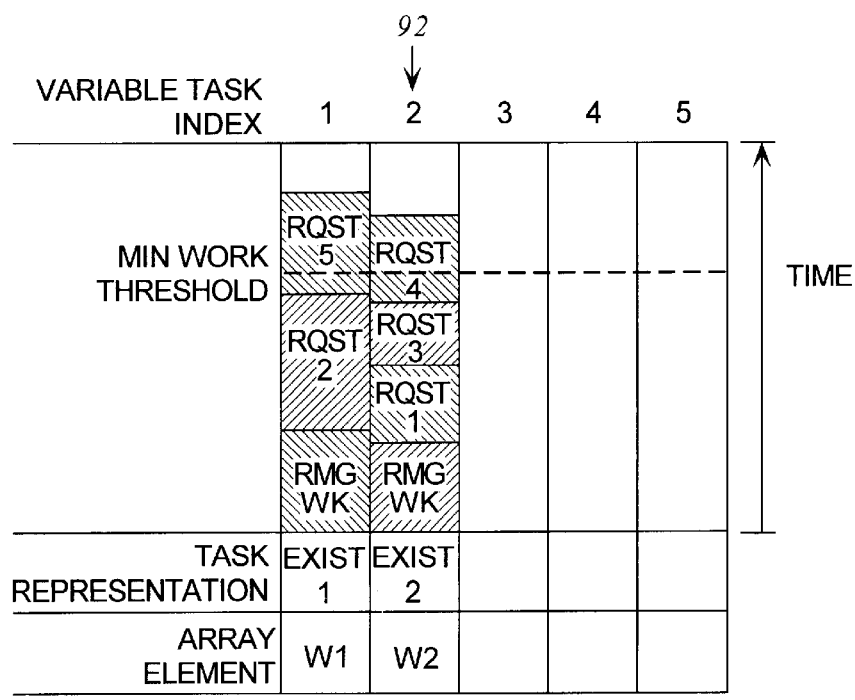

Referring to FIGS. 5B and 11 the parallel assessment algorithm 38B continues through operations 62, 68, and 70 as described above. At operation 72, request $R_5$ is retrieved from queue 13. At this stage, the value of array element $W_1$ is less than the minimum work threshold for existing task representation 1, and the value of $W_2$ exceeds the minimum work threshold of existing task representation 2. Therefore, operation 72 pseudo-assigns request $R_5$ to existing task representation 1, whereby the value of $W_1$ is incremented by a value representing the estimated time for processing request $R_5$. Next, operation 76 determines that existing task representation 1 is not a projected task representation whereupon the parallel assessment algorithm 38B then returns to operation 62. At this stage, the variable task index q is still 2, as shown by arrow 92 in FIG. 11.

Figure 12:
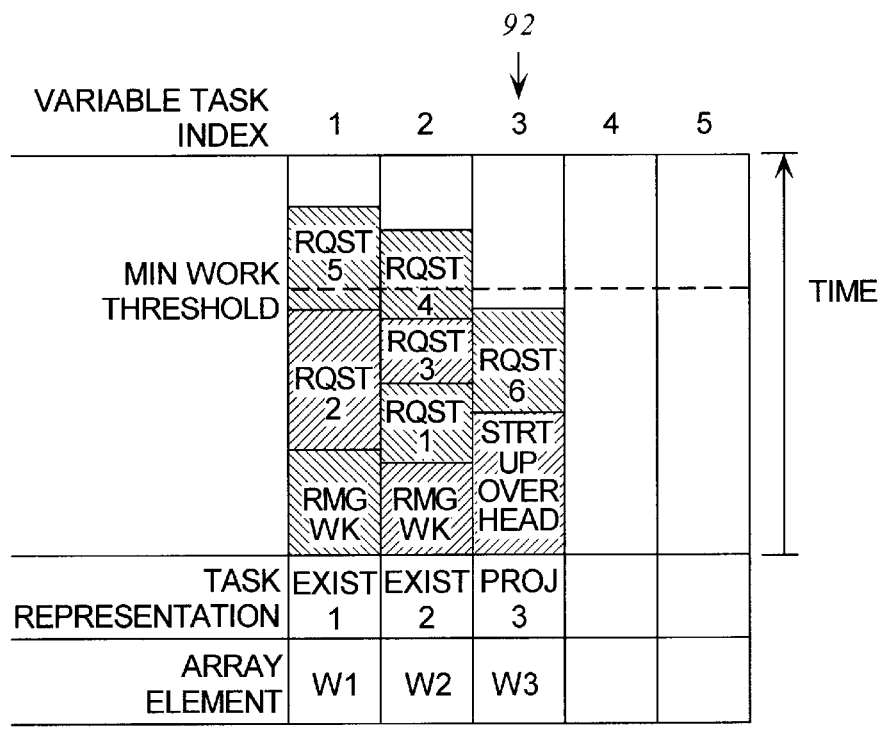

Referring to FIGS. 5B and 12, the parallel assessment algorithm 38B continues through operations 62 and 68, as described above. However, now operation 70 determines that all of the existing task representations 1 and 2 have associated array elements $W_1$ and $W_2$, respectively, that exceed the minimum work thresholds for existing task representations 1 and 2. Therefore, the parallel assessment algorithm 38B continues to operation 74 which increases the number of task representations by the addition of new projected task representation 3 to the simulation and increments the variable task index q to have a new value of 3, as indicated by arrow 92 in FIG. 12. Next, at operation 72, request $R_6$ is retrieved from queue 13 and pseudo-assigned to projected task representation 3 because the values of array elements $W_1$ and $W_2$ both exceed the overhead time thresholds of existing task representations 1 and 2, respectively, and because $W_3$ is less than the minimum work threshold of projected task representation 3. Projected task representation 3 does not represent an actual executing task, therefore, the value of array element $W_3$ is increased by an amount that represents the sum of the estimated time for processing request $R_6$ and the start-up overhead time for starting a task. So far, the value of array element $W_3$ is less than the minimum work threshold for projected task representation 3. Next, operation 76 determines that the value of array element $W_3$ does not exceed the minimum work threshold of projected task representation 3, whereupon the parallel assessment algorithm 38B returns directly to operation 62. At this stage, the variable task index q is 3, as shown by arrow 92 in FIG. 12.

Figure 13:
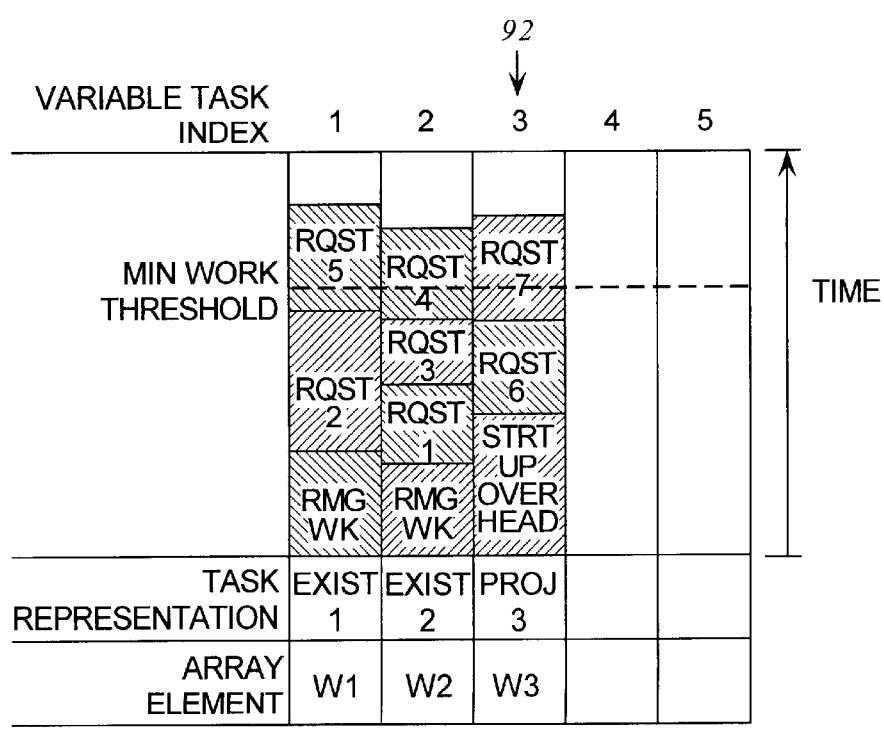

Referring to FIGS. 5B and 13, the parallel assessment algorithm 38B continues through operations 62 and 68, as described above. Operation 70 determines that all tasks, consisting of existing task representations 1 and 2, and projected task representation 3 are not busy beyond their respective minimum work thresholds because the value of array element $W_3$ is less than the minimum work threshold for projected task representation 3. Therefore, the parallel assessment algorithm 38B continues to operation 72 which retrieves request $R_7$ from queue 13 and pseudo-assigns request $R_7$ to projected task representation 3, causing $W_3$ to exceed the minimum work threshold of projected task representation 3. Next, operation 76 determines that the value of array element $W_3$ exceeds the minimum work threshold of projected task representation 3. Therefore, the parallel assessment algorithm 38B continues to operation 79 which indicates that projected task representation 3 may be transformed into an actual executing task. Transforming projected task representation 3 into an actual executing task means that a task is started to account for the work load of $R_6$ and $R_7$. The parallel assessment algorithm 38B then returns to operation 62. At this stage, the variable task index q is still 3, as shown by arrow 92 in FIG. 13.

Referring to FIGS. 5B and 14, the parallel assessment algorithm 38B continues through operations 62 and 68, as described above. Operation 70 determines that all existing and projected tasks, which includes existing task representations 1 and 2, and projected task representation 3 are busy beyond their respective minimum work thresholds because the values of array elements $W_1$, $W_2$ and $W_3$ all exceed the minimum work thresholds for existing task representations 1 and 2, and projected task representation 3, respectively. Therefore, the parallel assessment algorithm 38B continues to operation 74 which increases the number of existing and projected task representations by the addition of one projected task representation to the simulation. Now, the variable task index q has a value of 4, as indicated by arrow 92 in FIG. 14, and projected task representation 4 is created. Next, at operation 72, request $R_8$ is retrieved from queue 13 and pseudo-assigned to projected task representation 4 because the values of array elements $W_1$ and $W_2$ both exceed the overhead time thresholds of existing task representations 1 and 2, respectively, and because $W_3$ exceeds the minimum work threshold of projected task representation 3. Because projected task representation 4 does not represent an actual executing task, the value of array element $W_4$ is increased by an amount that represents the sum of the estimated time for processing request $R_8$ and the start-up overhead time for starting a task. Next, operation 76 determines that the value of array element $W_4$ exceeds the minimum work threshold of projected task representation 4, whereupon operation 79 provides an indication that projected task representations 3 and 4 may be transformed into actual executing tasks. Transforming task representation 4 into an actual executing task means that a task is created that accounts for the work load of request $R_8$. The parallel assessment algorithm 38B returns to operation 62. At this stage, the variable task index is 4, as shown by arrow 92 in FIG. 14.

Referring to FIGS. 5B and 15, the parallel assessment algorithm 38B continues through operations 62 and 68, as described above. However, operation 70 determines that all existing and projected task representations are busy beyond their respective minimum work thresholds because the values of array elements $W_1$, $W_2$, $W_3$, and $W_4$ all exceed the minimum work threshold for existing task representations 1–2 and projected task representations 3–4, respectively. Therefore, the parallel assessment algorithm 38B continues to operation 74 which increases the number of existing and projected task representations by the addition of a new projected task representation 5 to the simulation and increments the variable task index q to have a new value of 5, as indicated by arrow 92 in FIG. 15. Next, at operation 72, request $R_9$ is retrieved from queue 13 and is pseudo-assigned to projected task representation 5 because the value of array element $W_5$ is less than the values of array elements $W_1$–$W_4$, and because the values of array elements $W_1$–$W_4$ all exceed the minimum work thresholds for existing task representations 1–2 and projected task representations 3–4, respectively. Also at operation 72, a value representing the estimated start-up overhead time is added to the value of array element $W_5$. Next, operation 76 determines that the value of array element $W_5$ does not exceed the minimum work threshold of projected task representation 5, whereupon the parallel assessment algorithm 38B returns directly to operation 62. At this stage, the variable task index q is 5, as shown by arrow 92 in FIG. 15. Operation 62 determines that the sum of the current number of actual executing tasks (actual executing tasks 1 and 2) and the number of planned tasks that may be started (projected task representations 3 and 4) is not equal to the maximum task index m. A task that may be started is a projected task representation that has met its minimum work threshold. Next, operation 68 determines that all nine requests $R_1$–$R_9$ have been pseudo-assigned. The parallel assessment algorithm 38B then continues to operation 64.

Processor 12 may be implemented in various forms. As one example, processor 12 may comprise a digital data processor for executing various sequences of machine-readable instructions for executing the operations described with reference to the parallelism determinator routine 30, parallel assessment algorithms 38A and 38B, and the request assignor 50. In this respect, one aspect of the invention concerns a programmed product, comprising signal bearing media tangibly a program of machine-readable instructions executable by a digital data processor for effectuating the parallelism determinator routine 30, parallel assessment algorithms 38A and 38B, and the request assignor 50. The signal bearing medium may comprise a RAM contained within processor 12. The instructions may also be contained in other types of signal-bearing media such as a magnetic data storage diskette, magnetic tape, direct access storage device, electronic read only memory, and optical storage devices, all of which may be read by processor 12.

Processor 12 may also be implemented as a logic circuit having multiple interconnected electrically conductive elements configured to perform operations for implementing the method of the present invention.

Obviously, many modifications and variations of the present invention are possible in light of the above teachings. For example, the invention may be implemented whereby values representing start-up overhead times are not added to the array elements of the parallel assessment array. Although the minimum work and overhead thresholds are shown in FIGS. 8–15 to be equal for each of the existing and projected task representations, it is to be understood, that the thresholds may be different for each of the individual existing and projected task representations, as necessary to suit the requirements of a particular application. It is therefore to be understood that within the scope of the appended claims, the invention may be practiced otherwise than as specifically described.

What is claimed is:

1. A method for determining an optimal number of tasks for processing requests, comprising the operations of:
   determining if there are one or more first requests that have not been processed; and
   performing a parallelism assessment for simulating the assignment of said first requests to one or more task representations, wherein the task representations include at least one of a projected task representation and an actual executing task representation that each have a corresponding work value, wherein a selected request is pseudo assigned to a selected task representation, and when the selected task representation is a projected task representation, determining whether to transform the projected task representation into an actual executing task based on whether the work value corresponding to the projected task representation is equal to or greater than a work threshold after the selected request is pseudo-assigned to the projected task representation.

2. The method of claim 1 wherein said parallelism assessment is performed if there are fewer than a predetermined limit of actual executing tasks that are processing one or more second requests.

3. The method of claim 1 further including the operation of designating one or more particular task representations that are transformable into corresponding actual executing tasks, where said particular task representations are selected from said task representations.

4. The method of claim 3 wherein each of said particular task representations has a corresponding work value that is equal to or greater than a work threshold.

5. A method for determining an optimal number of tasks for processing requests, comprising the operations of:
   determining if there are one or more first requests that have not been processed; and
   performing a parallelism assessment for simulating the assignment of said first requests to one or more task representations, where said parallelism assessment comprises the operations of:
   determining a first number representing the quantity of actual executing tasks that are processing requests;
   defining an existing task representation for each actual executing task, where each said existing task representation has a corresponding work value;
   defining a projected task representation having a corresponding work value if:
      a second number representing the quantity of existing task representations and projected task representations is not equal to a predetermined limit;
      all of said first requests are not pseudo-assigned; and
      said work values corresponding to said existing task representations and said projected task representations are equal to or greater than a work threshold;
   pseudo-assigning a selected request, selected from all of said first requests, to a selected task representation that is selected from a group that includes said existing task representations and said projected task representations, where said selected task representation has a corresponding work value that is a minimum of all said work values corresponding to said existing task representations and said projected task representations, and said selected request has not been pseudo-assigned if:
      said number of said existing task representations is less than said predetermined limit;
      all said first requests have not been pseudo-assigned; and
      said work value corresponding to at least one of said existing task representations and said projected task representations is less than said work threshold; and starting said selected task representation if said selected task representation is a projected task representation and said work value corresponding to said selected task representation is equal to or greater than said work threshold after said selected request is pseudo-assigned to said selected task representation.

6. The method of claim 5 further includes the operation of pseudo-assigning a start-up overhead time to said work value corresponding to said selected task representation.

7. The method of claim 5 further includes storing said first requests in a queue.

8. The method of claim 1 further includes the operation of starting a task if there are requests to process and there are no actual executing tasks processing requests.

9. The method of claim 1 further includes the operation of transforming one or more particular task representations into corresponding actual executing tasks, where said particular task representations are selected from a group that includes said task representations.

10. The method of claim 9 wherein said corresponding particular task representations have corresponding work values that equal or exceed a work threshold.

11. A method for determining an optimal number of tasks for processing requests, comprising the operations of:
 determining if there are one or more first requests that have not been processed; and
 performing a parallelism assessment for simulating the assignment of said first requests to one or more task representations, where said parallelism assessment comprises the operations of:
  determining a first number representing the quantity of actual executing tasks that are processing requests,
  defining an existing task representation for each actual executing task, where each said existing task representation has a corresponding work value;
  defining a projected task representation having a corresponding work value if:
   a second number representing the quantity of existing task representations and projected task representations is not equal, to a predetermined limit;
   all of said first requests are not pseudo-assigned; and
   said work values corresponding to said existing task representations and said projected task representations are equal to or greater than a work threshold;
  pseudo-assigning a selected request, selected from all of said first requests, to a selected task representation that is selected from a group that includes said existing task representations and said projected task representations, where said selected task representation has a corresponding work value that is a minimum of all said work values corresponding to said existing task representations and said projected task representations, and said selected request has not been pseudo-assigned if:
   said number of said existing task representations is less than said predetermined limit;
   all said first requests have not been pseudo-assigned; and
   said work value corresponding to at least one of said existing task representations and said projected task representations is less than said work threshold; and
  indicating that said selected task representation is transformable into an actual task if said selected task representation is a projected task representation and said work value corresponding to said selected task representation is equal to or greater than said work threshold after said selected request is pseudo-assigned to said selected task representation.

12. The method of claim 11 further includes the operation of pseudo-assigning a start-up overhead time to said work value corresponding to said selected task representation.

13. The method of claim 11 further includes storing said first requests in a queue.

14. A method for determining an optimal number of tasks for processing requests, comprising the operations of:
 determining if there are one or more first requests that have not been processed; and
 performing a parallelism assessment for simulating the assignment of said first requests to one or more task representations if there are fewer than a predetermined limit of actual executing tasks that are processing one or more second requests, wherein the task representations include at least one of a projected task representation and an actual executing task representation that each have a corresponding work value, wherein a selected request is pseudo assigned to a selected task representation, and when the selected task representation is a projected task representation, indicating that the projected task representation is transformable into an actual executing task if a work value corresponding to the projected task representation is equal to or greater than a work threshold after the selected request is pseudo-assigned to the projected task representation.

15. A method for determining an optimal number of tasks for processing requests, comprising the operations of:
 determining if there are one or more first requests that have not been processed, and performing a parallelism assessment for simulating the assignment of said first requests to one or more task representations if there are fewer than a predetermined limit of actual executing tasks that are processing one or more second requests, where said parallelism assessment comprises the operations of:
  determining a first number representing the quantity of actual executing tasks that are processing said second requests;
  defining an existing task representation for each said actual executing task, where each said existing task representation has a corresponding first work value;
  defining a projected task representation having a corresponding second work value if:
   a second number representing the sum of said first number and number of projected task representations is less than or equal to said predetermined limit;
   all of said first requests are not pseudo-assigned; and
   each of said first work values are equal to or greater than a work threshold;
  pseudo-assigning a selected request, selected from all of said first requests, to a selected task representation that is selected from a group that includes said existing task representations and said projected task representation, where said selected task representation has a corresponding minimum work value that is a minimum of said first and second work values, if said selected request has not been pseudo-assigned and said minimum work value is less than said work threshold.

16. The method of claim 15 further comprising pseudo-assigning said selected request to one of said existing task representations having said minimum work value if said minimum work value is less than said work threshold.

17. The method of claim 15 further comprising pseudo-assigning said selected request to said projected task representations if said projected task representation has a minimum work value that is less than said work threshold.

18. The method of claim 17 further comprising starting said projected task representation if said projected task representation has a work value that is equal to or greater than said work threshold after said selected request is pseudo-assigned to said projected task representation.

19. The method of claim 17 further comprising indicating that said projected task representation is transformable into an actual executing task if said projected task representation has a work value that is equal to or greater than said work threshold after said selected request is pseudo-assigned to said projected task representation.

20. The method of claim 14 further comprising starting a task if there are requests to process and there are no actual executing tasks processing requests.

21. A signal-bearing medium tangibly embodying a program of machine-readable instructions executable by a digital processing apparatus to perform operations for determining an optimal number of tasks for processing requests, the operations comprising:
   determining if there are one or more first requests that have not been processed; and
   performing a parallelism assessment for simulating the assignment of said first requests to one or more task representations, wherein the task representations include at least one of a projected task representation and an actual executing task representation that each have a corresponding work value, wherein a selected request is pseudo assigned to a selected task representation, and when the selected task representation is a projected task representation, determining whether to transform the projected task representation into an actual executing task based on whether the work value corresponding to the projected task representation is equal to or greater than a work threshold after the selected request is pseudo-assigned to the projected task representation.

22. The medium of claim 21 wherein said parallelism assessment is performed if there are fewer than a predetermined limit of actual executing tasks that are processing one or more second requests.

23. The medium of claim 21 the operations further comprising designating one or more particular task representations that are transformable into corresponding actual executing tasks, where said particular task representations are selected from said task representations.

24. The medium of claim 23 wherein each of said particular task representations has a corresponding work value that is equal to or greater than a work threshold.

25. A signal-bearing medium tangibly embodying a program of machine-readable instructions executable by a digital processing apparatus to perform operations for determining an optimal number of tasks for processing requests, the operations comprising:
   determining if there are one or more first requests that have not been processed; and
   performing a parallelism assessment for simulating the assignment of said first requests to one or more task representations, where said parallelism assessment comprises the operations of:
     determining a first number representing the quantity of actual executing tasks that are processing requests;
     defining an existing task representation for each actual executing task, where each said existing task representation has a corresponding work value;
     defining a projected task representation having a corresponding work value if:
       a second number representing the quantity of existing task representations and projected task representations is not equal to a predetermined limit;
       all of said first requests are not pseudo-assigned; and
       said work values corresponding to said existing task representations and said projected task representations are equal to or greater than a work threshold;
     pseudo-assigning a selected request, selected from all of said first requests, to a selected task representation that is selected from a group that includes said existing task representations and said projected task representations, where said selected task representation has a corresponding work value that is a minimum of all said work values corresponding to said existing task representations and said projected task representations, and said selected request has not been pseudo-assigned if:
       said number of said existing task representations is less than said predetermined limit;
       all said first requests have not been pseudo-assigned; and
       said work value corresponding to at least on of said existing task representations and said projected task representations is less than said work threshold; and
     starting said selected task representation if said selected task representation is a projected task representation and said work value corresponding to said selected task representation is equal to or greater than said work threshold after said selected request is pseudo-assigned to said selected task representation.

26. The medium of claim 25 the operations further comprising pseudo-assigning a start-up overhead time to said work value corresponding to said selected task representation.

27. The medium of claim 25 operations further comprising storing said first requests in a queue.

28. The medium of claim 21 the operations further comprising starting a task if there are requests to process and there are no actual executing tasks processing requests.

29. The medium of claim 21 the operations further comprising transforming one or more particular task representations into corresponding actual executing tasks, where said particular task representations are selected from a group that includes said task representations.

30. The medium of claim 29 wherein said corresponding particular task representations having corresponding work values that equal or exceed a work threshold.

31. A signal-bearing medium tangibly embodying a program of machine-readable instructions executable by a digital processing apparatus to perform operations for determining an optimal number of tasks for processing requests, the operations comprising:
   determining if there are one or more first requests that have not been processed; and
   performing a parallelism assessment for simulating the assignment of said first requests to one or task representations, where said parallelism assessment comprises the operations of:
     determining the first number presenting the quantity of actual executing tasks that are precessing requests;
     defining an existing task representation for each actual executing task, where each said existing task representation has a corresponding work value;

defining a projected task representation having a corresponding work value if:
   a second number representing the quantity of existing task representations and projected task representations is not equal to a predetermined limit;
   all of said first requests are not pseudo-assigned; and
   said work values corresponding to said existing task representations and said projected task representations are equal to or greater than a work threshold;
pseudo-assigning a selected request, selected from all of said first requests, to a selected task representation that is selected from a group that includes said existing task representations and said projected task representations, where said selected task representation has a corresponding work value that is a minimum of all said work values corresponding to said existing task representations and said projected task representations, and said selected request has not been pseudo-assigned if:
   said number of said existing task representations is less than said predetermined limit;
   all said first requests have not been pseudo-assigned; and
   said work value corresponding to at least one of said existing task representations and said projected task representations is less than said work threshold; and
indicating that said selected task representation is transformable into an actual task if said selected task representation is a projected task representation and said work value corresponding to said selected task representation is equal to or greater than said work threshold after said selected request is pseudo-assigned to said selected task representation.

32. The medium of claim 31 the operations further comprising pseudo-assigning a start-up overhead time to said work value corresponding to said selected task representation.

33. The medium of claim 31 the operations further comprising storing said first requests in a queue.

34. A signal-bearing medium tangibly embodying a program of machine-readable instructions executable by a digital processing apparatus to perform operations for determining an optimal number of task for processing request, the operations comprising:
   determining if there are one or more first requests that have not been processed; and
   performing a parallelism assessment for simulating the assignment of said first requests to one or more task representations if there are fewer than a predetermined limit of actual executing tasks that are processing one or more second requests, wherein the task representations include at least one of a projected task representation and an actual executing task representation that each have a corresponding work value, wherein a selected request is pseudo assigned to a selected task representation, and when the selected task representation is a projected task representation, indicating that the projected task representation is transformable into an actual executing task if a work value corresponding to the projected task representation is equal to or greater than a work threshold after the selected request is pseudo-assigned to the projected task representation.

35. A signal-bearing medium tangibly embodying a program of machine-readable instructions executable by a digital processing apparatus to perform operations for determining an optimal number of task for processing request, the operations comprising:
   determining if there are one or more first requests that have not been processed; and
   performing a parallelism assessment for simulating the assignment of said first requests to one or more task representations if there are fewer than a predetermined limit of actual executing tasks that are processing one or more second requests, where said parallelism assessment comprises the operations of:
      determining a first number representing the quantity of actual executing tasks that are processing said second requests;
      defining an existing task representation for each said actual executing task, where each said existing task representation has a corresponding first work value;
      defining a projected task representation having a corresponding second work value if:
         a second number representing the sum of said first number and number of projected task representations is less than or equal to said predetermined limit;
         all of said first requests are not pseudo-assigned; and
         each of said first work values are equal to or greater than a work threshold;
   pseudo-assigning a selected request, selected from all of said first requests, to a selected task representation that is selected from a group that includes said existing task representations and said projected task representation, where said selected task representation has a corresponding minimum work value that is a minimum of said first and second work values, if said selected request has not been pseudo-assigned and said minimum work value is less than said work threshold.

36. The medium of claim 35 the operations further comprising pseudo-assigning said selected request to one of said existing task representations having said minimum work value if said minimum work value is less than said work threshold.

37. The medium of claim 35 the operations further comprising pseudo-assigning said selected request to said projected task representation if said projected task representation has a minimum work value that is less than said worth threshold.

38. The medium of claim 37 the operations further comprising starting said projected task representation if said projected task representation has a work value that is equal to or greater than said work threshold after said selected request is pseudo-assigned to said projected task representation.

39. The medium of claim 37 the operations further comprising indicating that said projected task representation is transformable into an actual executing task if said projected task representation has a work value that is equal to or greater than said work threshold after said selected request is pseudo-assigned to said projected task representation.

40. The medium of claim 34 the operations further comprising starting a task if there are requests to process and there are no actual executing tasks processing requests.

41. A system for determining an optimal number of tasks for processing requests, comprising:
   means for determining if there are one or more first requests that have not been processed; and
   means for performing a parallelism assessment for simulating the assignment of said first requests to one or more task representations, wherein the task representations include at least one of a projected task representation and an actual executing task representation that each have a corresponding work value, wherein a selected request is pseudo assigned to a selected task representation, and when the selected task representation is a projected task representation, determining whether to transform the projected task representation into an actual executing task based on whether the work value corresponding to the projected task representation is equal to or greater than a work threshold after the selected request is pseudo-assigned to the projected task representation.

42. A system for determining an optimal number of tasks for processing requests, comprising:
means for determining if there are one or more first requests that have not been processed; and
means for performing a parallelism assessment for simulating the assignment of said first requests to one or more task representations, where said parallelism assessment further comprises means for:
determining a first number representing the quantity of actual executing tasks that are processing requests;
defining an existing task representation for each actual executing task, where each said existing task representation has a corresponding work value;
defining a projected task representation having a corresponding work value if:
a second number representing the quantity of existing task representations and projected task representations is not equal to a predetermined limit;
all of said first requests are not pseudo-assigned; and
said work values corresponding to said existing task representations and said projected task representations are equal to or greater than a work threshold;
pseudo-assigning a selected request, selected from all of said first requests, to a selected task representation that is selected from a group that includes said existing task representations and said projected task representations, where said selected task representation has a corresponding work value that is a minimum of all said work values corresponding to said existing task representations and said projected task representations, and said selected request has not been pseudo-assigned if:
said number of said existing task representations is less than said predetermined limit;
all said first requests have not been pseudo-assigned; and
said work value corresponding to at least one of said existing task representations and said projected task representations is less than said work threshold; and
starting said selected task representation if said selected task representation is a projected task representation and said work value corresponding to said selected task representation is equal to or greater than said work threshold after said selected request is pseudo-assigned to said selected task representation.

43. The system of claim 42 further includes means for pseudo-assigning a start-up overhead time to said work value corresponding to said selected task representation.

44. The system of claim 42 further includes means for storing said first requests in a queue.

45. A system for determining an optimal number of tasks for processing requests, comprising:
means for determining if there are one or more first requests that have not been processed; and
means for performing a parallelism assessment for simulating the assignment of said first requests to one or more task representations, where said parallelism assessment further comprises means for:
determining a first number representing the quantity of actual executing tasks that are processing requests,
defining an existing task representation for each actual executing task, where each said existing task representation has a corresponding work value;
defining a projected task representation having a corresponding work value if:
a second number representing the quantity of existing task representations and projected task representations is not equal to a predetermined limit;
all of said first requests are not pseudo-assigned; and
said work values corresponding to said existing task representations and said projected task representations are equal to or greater than a work threshold;
pseudo-assigning a selected request, selected from all of said first requests, to a selected task representation that is selected from a group that includes said existing task representations and said projected task representations, where said selected task representation has a corresponding work value that is a minimum of all said work values corresponding to said existing task representations and said projected task representations, and said selected request has not been pseudo-assigned if:
said number of said existing task representations is less than said predetermined limit;
all said first requests have not been pseudo-assigned; and
said work value corresponding to at least one of said existing task representations and said projected task representations is less than said work threshold; and
indicating that said selected task representation is transformable into an actual task if said selected task representation is a projected task representation and said work value corresponding to said selected task representation is equal to or greater than said work threshold after said selected request is pseudo-assigned to said selected task representation.

46. The system of claim 45 further includes means for pseudo-assigning a start-up overhead time to said work value corresponding to said selected task representation.

47. The system of claim 45 further includes means for storing said first requests in a queue.

48. A system for determining an optimal number of tasks for processing requests, comprising:
means for determining if there are one or more first requests that have not been processed; and
means for performing a parallelism assessment for simulating the assignment of said first requests to one or more task representations if there are fewer than a predetermined limit of actual executing tasks that are processing one or more second requests, wherein the task representations include at least one of a projected task representation and an actual executing task representation that each have a corresponding work value, wherein a selected request is pseudo assigned to a selected task representation, and when the selected task representation is a projected task representation, indicating that the projected task representation is transformable into an actual executing task if a work value corresponding to the projected task representation is equal to or greater than a work threshold after the selected request is pseudo-assigned to the projected task representation.

49. A system for determining an optimal number of tasks for processing requests, comprising:

means for determining if there are one or more first requests that have not been processed; and means for performing a parallelism assessment for simulating the assignment of said first requests to one or more task representations if there are fewer than a predetermined limit of actual executing tasks that are processing one or more second requests, where said parallelism assessment further comprises means for:

determining a first number representing the quantity of actual executing tasks that are processing said second requests;

defining an existing task representation for each said actual executing task, where each said existing task representation has a corresponding first work value;

defining a projected task representation having a corresponding second work value if:

second number representing the sum of said first number and number of projected task representations is less than or equal to said predetermined limit;

all of said first requests are not pseudo-assigned; and each of said first work values are equal to or greater than a work threshold;

pseudo-assigning a selected request, selected from all of said first requests, to a selected task representation that is selected from a group that includes said existing task representations and said projected task representation, where said selected task representation has a corresponding minimum work value that is a minimum of said first and second work values, if said selected request has not been pseudo-assigned and said minimum work value is less than said work threshold.

50. The system of claim 49 further comprising means for pseudo-assigning said selected request to one of said existing task representations having said minimum work value if said minimum work value is less than said work threshold.

51. The system of claim 49 further comprising means for pseudo-assigning said selected request to said projected task representations if said projected task representation has a minimum work value that is less than said work threshold.

52. The system of claim 51 further comprising means for starting said projected task representation if said projected task representation has a work value that is equal to or greater than said work threshold after said selected request is pseudo-assigned to said projected task representation.

53. The system of claim 51 further comprising means for indicating that said projected task representation is transformable into an actual executing task if said projected task representation has a work value that is equal to or greater than said work threshold after said selected request is pseudo-assigned to said projected task representation.

* * * * *